United States Patent
Saab et al.

(10) Patent No.: US 12,512,880 B2
(45) Date of Patent: Dec. 30, 2025

(54) LOW COMPLEXITY LOS MIMO SYSTEM DESIGN FOR NEAR FIELD COMMUNICATION

(71) Applicant: Samsung Electronics Co., Ltd., Suwon-si (KR)

(72) Inventors: Sandy Saab, Plano, TX (US); Jorge Luis Gomez Ponce, Los Angeles, CA (US); Shadi Abu-Surra, Plano, TX (US); Gang Xu, Allen, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 229 days.

(21) Appl. No.: 18/364,405

(22) Filed: Aug. 2, 2023

(65) Prior Publication Data
US 2024/0048192 A1     Feb. 8, 2024

Related U.S. Application Data

(60) Provisional application No. 63/395,232, filed on Aug. 4, 2022.

(51) Int. Cl.
*H04B 7/0426* (2017.01)
*H04L 27/26* (2006.01)

(52) U.S. Cl.
CPC .......... *H04B 7/0443* (2013.01); *H04B 7/043* (2013.01); *H04L 27/2628* (2013.01)

(58) Field of Classification Search
CPC ... H04B 1/02; H04B 7/04; H04B 7/06; H04B 7/08; H04B 7/0417; H04B 7/0426; H04B 7/0443; H04B 7/0456; H04L 27/26; H04L 27/2628; H04W 16/28; H04W 24/08; H04W 27/21; H04W 72/04
(Continued)

(56) References Cited

U.S. PATENT DOCUMENTS 9,866,289 B2   1/2018   Babaei et al.
11,202,211 B2*   12/2021   Sasaki .................. H04B 7/0469
(Continued)

FOREIGN PATENT DOCUMENTS

KR    101718282 B1    3/2017
KR    102079436 B1    2/2020
(Continued)

OTHER PUBLICATIONS

International Search Report and Written Opinion issued Nov. 7, 2023 regarding International Application No. PCT/KR2023/011525, 10 pages.
(Continued)

*Primary Examiner* — Shawkat M Ali

(57) ABSTRACT

A uniform circular array (UCA) is assisted with an analog inverse fast Fourier Fast transform (IFFT)/fast Fourier transform (FFT) precoder to reduce computational complexity in one or more line-of-sight (LoS) multiple-input multiple-output (MIMO) networks. Each port of the UCA includes a steerable miniaturized array with beam steering capability. Analog beam steering is performed via one of the analog IFFT/FFT precoder or one of the steerable miniaturized arrays in a port of the UCA, for improving one or more properties of steering one or more beams toward one or more intended destinations in the one or more LoS MIMO networks.

20 Claims, 14 Drawing Sheets

(58) Field of Classification Search
USPC ............... 375/219, 260, 262, 267, 295, 316
See application file for complete search history.

(56) References Cited

U.S. PATENT DOCUMENTS

| | | | |
|---|---|---|---|
| 11,362,440 | B2 | 6/2022 | Zenkyu et al. |
| 11,489,573 | B2 | 11/2022 | Ashrafi |
| 11,722,202 | B1* | 8/2023 | Neshaastegaran ... H04B 7/0617 375/267 |
| 12,231,912 | B2* | 2/2025 | Horn ..................... H04W 16/28 |
| 2020/0296599 | A1 | 9/2020 | Sasaki et al. |

FOREIGN PATENT DOCUMENTS

| | | |
|---|---|---|
| KR | 20220033032 A | 3/2022 |
| KR | 10-2023-0063371 A | 5/2023 |
| WO | 2023019416 A1 | 2/2023 |
| WO | 2023087297 A1 | 5/2023 |

OTHER PUBLICATIONS

Cho et al., "Capacity-Achieving Precoding with Low-Complexity for Terahertz LOS Massive MIMO using Uniform Planar Arrays", 2020 International Conference on Information and Communication Technology Convergence (ICTC), Oct. 2020, p. 535.

Hassan et al., "Evaluation of Different Phased Array Approaches for Orbital Angular Momentum Beam Steering", 2020 German Microwave Conference (GeMiC), Mar. 2020, pp. 44-47.

Jian et al., "NLOS OAM-MIMO Transmission: Misaligned Channel Analysis and Pre-processing Scheme Design", 2020 International Wireless Communications and Mobile Computing (IWCMC), Jun. 2020, pp. 1866-1871.

Balanis, C., "Antenna Theory Analysis and Design", Third Edition, John Wiley & Sons, Inc., 2005, 1072 pages.

Song, H., et al., "Terahertz Communications: Challenges in the Next Decade", IEEE Transactions on Terahertz Science and Technology, vol. 12, No. 2, Mar. 2022, 13 pages.

Do, H., et al., "Reconfigurable ULAs for Line-of-Sight MIMO Transmission", IEEE Transactions on Wireless Communications, vol. 20, No. 5, May 2021, 12 pages.

Molisch, A., "Wireless Communications", Second Edition, Wiley Publishing, 2011, 884 pages.

Goldsmith, A., "Wireless Communications", Cambridge: Cambridge University Press, 2005, 673 pages.

Shannon, C.E., "A Mathematical Theory of Communication", The Bell System Technical Journal, vol. 27, Jul., Oct. 1948, 55 pages.

Foschini, G., et al., "On Limits of Wireless Communications in a Fading Environment when Using Multiple Antennas", Wireless Personal Communications 6, 1998, Kluwer Academic Publishers, 25 pages.

Chen, R., et al., "Hybrid Mechanical and Electronic Beam Steering for Maximizing OAM Channel Capacity", arXiv:2202.11693v2 [cs.IT], Aug. 5, 2022, 18 pages.

Goodman, N., et al., "The Impact of Antenna Directivity on the Small-Scale Fading in Indoor Environments", IEEE Transactions on Antennas and Propagation, vol. 54, No. 12, Dec. 2006, 7 pages.

Jeon, Y., et al., "Design and Analysis of LoS MIMO Systems with Uniform Circular Arrays", arXiv:2006.16515v1 [eess.SP] Jun. 30, 2020, 13 pages.

Chen, R., et al., "Beam Steering for the Misalignment in UCA-Based OAM Communication Systems", IEEE Wireless Communications Letters, vol. 7, No. 4, Aug. 2018, 5 pages.

* cited by examiner

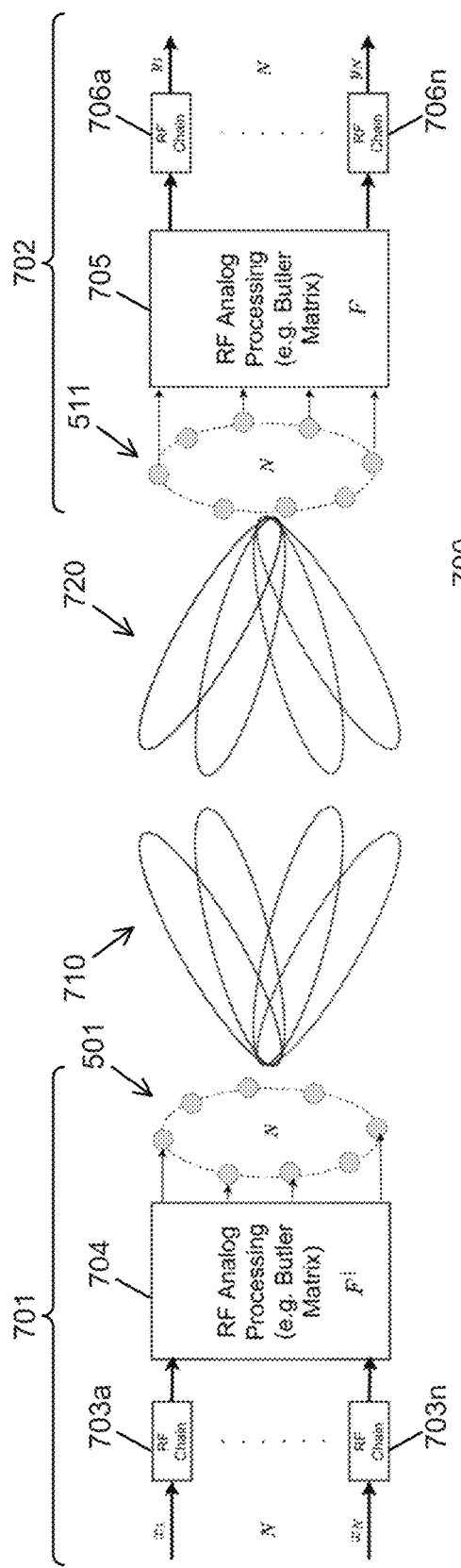
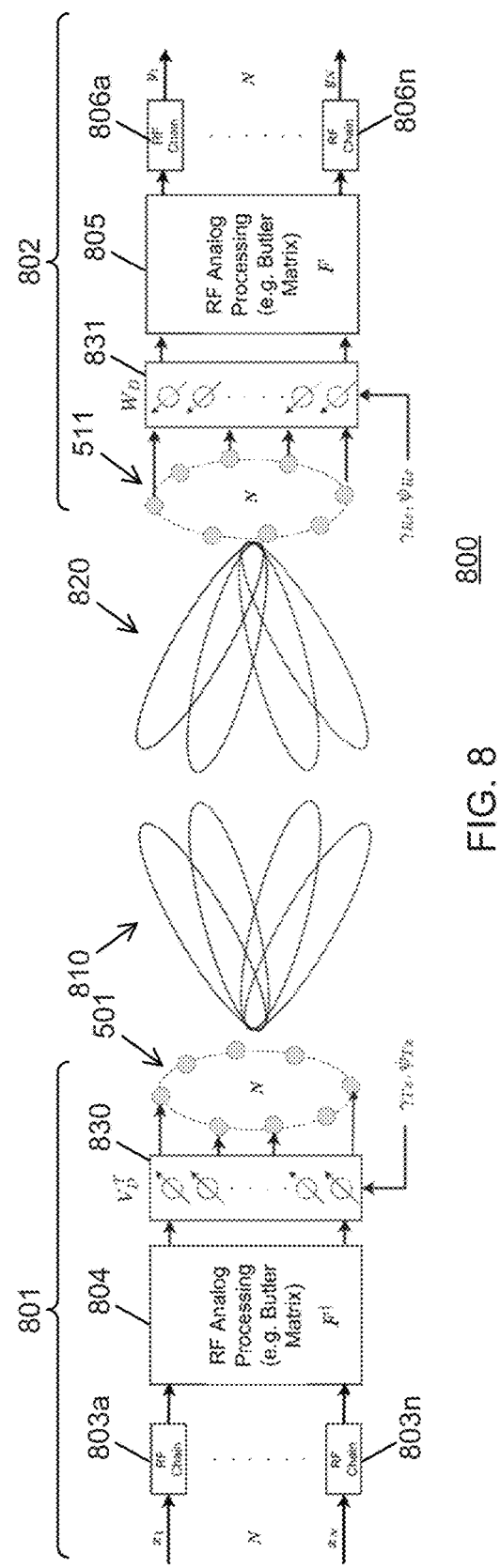
FIG. 7
FIG. 8

LOW COMPLEXITY LOS MIMO SYSTEM DESIGN FOR NEAR FIELD COMMUNICATION

CROSS-REFERENCE TO RELATED APPLICATION AND CLAIM OF PRIORITY

This application claims priority under 35 U.S.C. § 119(e) to U.S. Provisional Patent Application No. 63/395,232 filed Aug. 4, 2022. The content of the above-identified patent document(s) is incorporated herein by reference.

TECHNICAL FIELD

The present disclosure relates generally to circular antenna arrays and, more specifically, to low complexity circular antenna array configurations.

BACKGROUND

To meet the demand for wireless data traffic having increased since deployment of 4G communication systems and to enable various vertical applications, 6G/5G/NR communication systems have been developed and are currently being deployed. The 6G/5G1'NR communication system is considered to be implemented in higher frequency (mm-Wave) bands, e.g., 28 giga-Hertz (GHz) or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 6G/5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 6G and 5G systems and frequency bands associated therewith is for reference as certain embodiments of the present disclosure may be implemented in 6G 5G systems. However, the present disclosure is not limited to 6G/5G systems or the frequency bands associated therewith, and embodiments of the present disclosure may be utilized in connection with any frequency band. For example, aspects of the present disclosure may also be applied to deployment of 6G/5G communication systems, 6G or even later releases which may use terahertz (THz) bands.

SUMMARY

A uniform circular array (UCA) is assisted with an analog inverse fast Fourier Fast transform (IFFT)/fast Fourier transform (FFT) precoder to reduce computational complexity in one or more line-of-sight (LoS) multiple-input multiple-output (MIMO) networks. Each port of the UCA includes a steerable miniaturized array with beam steering capability. Analog beam steering is performed via one of the analog IFFT/FFT precoder or one of the steerable miniaturized arrays in a port of the UCA, for improving one or more properties of steering one or more beams toward one or more intended destinations in the one or more LoS MIMO networks.

In a first embodiment, a method includes providing a uniform circular array (UCA) assisted with an analog inverse fast Fourier Fast transform (FFT)/fast Fourier transform (EFT) precoder to reduce computational complexity in one or more line-of-sight (LoS) multiple-input multiple-output (MIMO) networks. The method further includes providing, in each port of the UCA, a respective steerable miniaturized array with beam steering capability. The method also includes performing analog beam steering, via one of the analog IFFT/FFT precoder or one of the steerable miniaturized arrays in a port of the UCA, for improving one or more properties of steering one or more beams toward one or more intended destinations in the one or more LoS MIMO networks.

In a second embodiment, an apparatus includes a uniform circular array (UCA) assisted with an analog inverse fast Fourier Fast transform (IFFT)/fast Fourier ransform (FFT) precoder, configured to reduce computational complexity in one or more line-of-sight (LoS) multiple-input multiple-output (MIMO) networks. The apparatus further includes, in each port of the UCA, a respective steerable miniaturized array with beam steering capability. The apparatus also includes a controller configured to perform analog beam steering, via one of the analog IFFT/FFT precoder or one of the steerable miniaturized arrays in a port of the UCA, for improving one or more properties of steering one or more beams toward one or more intended destinations in the one or more LoS MIMO networks.

In any of the preceding embodiments, the one or more LoS MIMO networks may include one or more LoS MIMO backhaul mesh networks.

In any of the preceding embodiments, the one or more properties may include analog beam steering flexibility.

In any of the preceding embodiments, the analog beam steering may correct for offsets in azimuth and elevation for the one or more intended destinations.

In any of the preceding embodiments, the analog beam steering may be based on an estimate for displacement of the one or more intended destinations.

In any of the preceding embodiments, the analog beam steering may be based on estimates for elevation angle $\psi$ and azimuth rotation $\gamma$ for the one or more intended destinations.

In any of the preceding embodiments, equal power may be allocated to all ports of the UCA.

In any of the preceding embodiments, a water-filling power allocation scheme may be employed to allocate power among best ports of the UCA.

In any of the preceding embodiments, the analog IFTT/FFT precoder may employ a rotation matrix.

In any of the preceding embodiments, the beam steering may be performed based on an angular range for 1% and 5% losses.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 7 is a block diagram illustrating an analog IFFT/FFT implementation in a UCA LoS MIMO system;

FIG. 8 is a block diagram illustrating a beamsteering addition to an analog IFFT/FFT implementation in a UCA LoS MIMO system in accordance with embodiments of the present disclosure;

DETAILED DESCRIPTION

Figure 1:
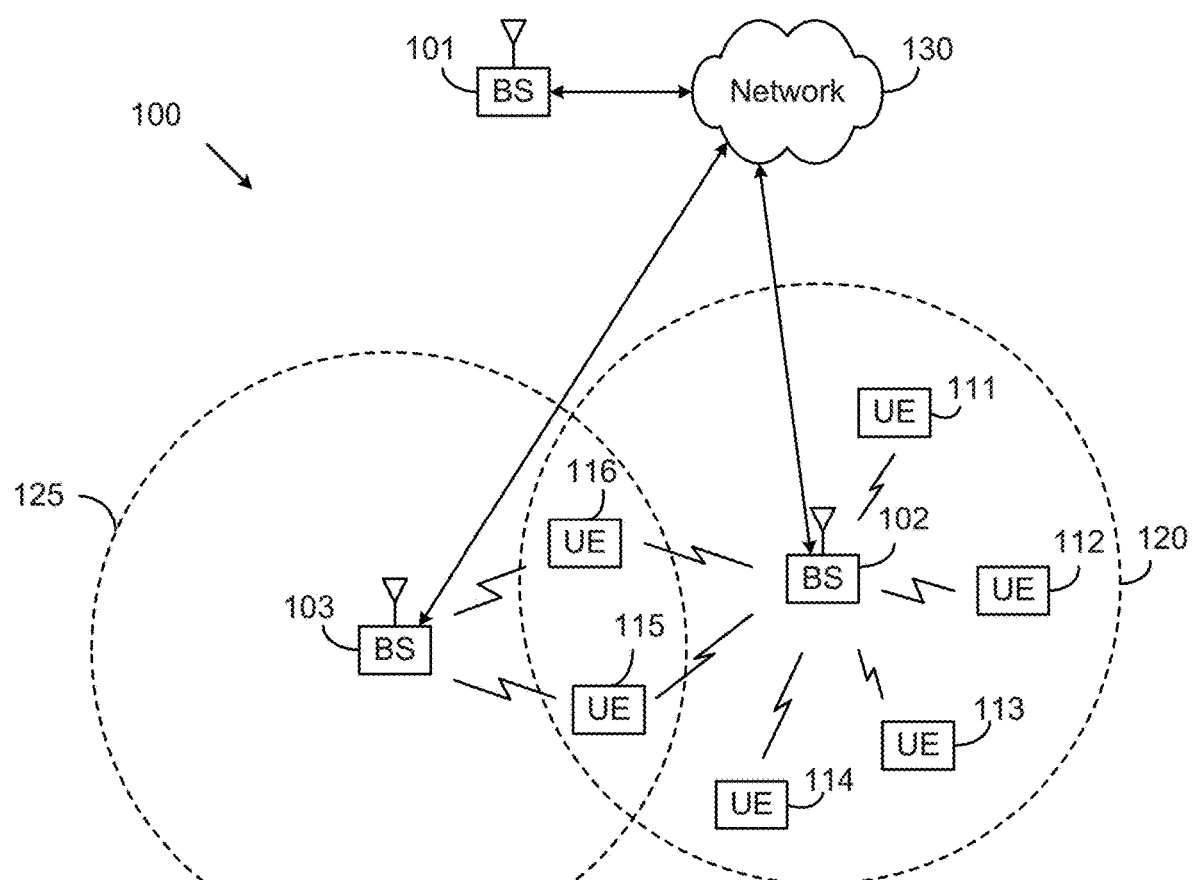
FIG. 1 illustrates an exemplary networked system utilizing circular antenna arrays designed according to various embodiments of this disclosure.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

REFERENCES

[1] Balanis, C. A. Antenna Theory: Analysis and Design (New Jersey, John Wiley and Sons, 2005).

[2] Song, H. J. & Lee, N. Terahertz communications: Challenges in the next decade. IEEE Transactions on Terahertz Science and Technology 12, 105-117 (2022).

[3] Do, H. et al. Reconfigurable - ULM for Line-of-Sight MIMO Transmission. IEEE Transactions on Wireless Communications 20, 2933-2947 (2021).

[4] Andreas F. Molisch. 2011, Wireless Communications (2nd. ed.), Wiley Publishing.

[5] R. Chen, W. -X. 1,ong and J. Li, "Reception of Misaligned Multi-Mode OAM Signals," 2019 IEEE Global Communications Conference (GLOBECOM), 2019, pp. 1-5, doi:

[6] A. Goldsmith, Wireless Communications. Cambridge: Cambridge University Press, 2005.

[7] C. E. Shannon, "A mathematical theory of communication," in The Bell System Technical Journal, vol, 27, no. 3, pp, 379-423, July 1948, doi: 10.1002/j.1538-7305.1948.tb01338.x.

[8] J, Winters, "On the Capacity of Radio Communication Systems with Diversity in a Rayleigh Fading Environment," in IEEE Journal on Selected Areas in Communications, vol. 5, no. 5, pp. 871-878, June 1987, doi: 10.1109/JSAC.1987.1146600.

[9] Foschini, Gans, M. On Limits of Wireless Communications in a Fading Environment when Using Multiple Antennas. Wireless Personal Communications 6, 311-335 (1998). https://doi .org/10.1023/A:1008889222784.

[10] W. Zhang et al., "Mode Division Multiplexing Communication Using Microwave Orbital Angular Momentum: An Experimental Study," in IEEE Transactions on Wireless Communications, vol. 16, no. 2, pp. 1308-1318, February 2017, doi: 10.1109/TWC.2016.2645199.

[11] H, Cho, C. Park and N. Lee, "Capacity-Achieving Precoding with Low-Complexity for Terahertz LOS Massive MIMO using Uniform Planar Arrays," 2020 International Conference on Information and Communication Technology Convergence (ICTC), 2020, pp. 535-539, doi.: 10.1109/ICTC49870.2020.9289295.

[12] R. Chen, Z. Tian, W. X. Long, X. Wang, W. Zhang, "Hybrid Mechanical and Electronic Beam Steering for Maximizing OAM Channel Capacity". arXiv, 2022.

[13] R. Chen, M. Zou and. J. Li, "Effect of Beam Steering on the Performance of Misaligned Multi-Mode OAM Communications," 2019 IEEE 90th Vehicular Technology Conference (VrC2019-Fall), 2019, pp. 1-5, doi: 10.1109/VTCFall.2019.8891167.

[14] H. Cho, C. Park and N. Lee, "Capacity-Achieving Precoding with Low-Complexity for Terahertz LOS Massive MIMO using Uniform Planar Arrays," 2020 International Conference on Information and Communication Technology Convergence (ICTC), 2020, pp. 535-539.

[15] M. Palaiologos, M. H. C. Garcia, R. A. Stirling-Gallacher and G. Caire, "Design of Robust LoS MIMO Systems with UCAS," 2021 IFEE 94th Vehicular Technology Conference (VTC2021-Fall), 2021, pp. 1-5, doi: 10.1109/VTC2021-Fall52928.2021.9625511.

[16] N. A. Goodman and K. L. Melde, "The Impact of Antenna Directivity on the Small-Scale Fading in Indoor Environments," in IEEE Transactions on Antennas and Propagation, vol, 54. no. 12, pp. 3771-3777, December 2006, doi: 10.1109/TAP.2006.886530.

The above-identified reference(s) are incorporated herein by reference.

Data rates in the order of terra-bits-per-second (Tbps) are considered a key enabling feature of future 6G wireless communication networks. Besides exploiting the large frequency bandwidths at terra-Hertz (THz) frequencies, new techniques to enhance the spectral efficiency are being explored. One enabling technology is line-of-sight (LoS) multi-input multi-output (MIMO) that aims at reaching high data rates and reliable transmission.

Establishing a functional and steady communication system at THz frequencies is non-trivial. Atmospheric absorption and signal attenuation can degrade the performance of a THz communication system. At THz frequencies, multipath propagation is very weak as seen by the Fresnel principle [1]. The efficiency of diffraction is reduced at THz since the surface roughness of common objects is relatively comparable to the wavelength [2]. The large reflection losses at THz frequencies result in having the dominant propagation mode to be LoS [3]. The Fraunhofer distance [1], at THz frequencies shows that the propagation medium to be in the radiating near-field. Hence, the spherical-wave model is adopted since the plane-wave assumption will affect the rank and singular value distribution of the channel matrix.

Achieving Tbps data rates require multi-streams/multi-layer transmissions. When the number of antenna layers grow, however, the computational complexity of the capacity achieving singular value decomposition (SVD) preceding increases significantly. This results in an energy inefficient baseband processor. Hence, this disclosure aims to reduce the computation complexity with the use of analog devices in a mesh network. Use of Fast Fourier Transform (FFT)-based precodino per antenna layer is proposed, and use of uniform circular arrays (LICAs) that are diagonalizable to assist with the FFT and inverse FFT (TUT) processes is explored. Such approach results in an efficient and stable communication system with less computational complexity overhead.

To have a good condition number (preferably approaching 1) and to maintain orthogonality between the signal streams in a LoS MINIO system, perfect alignment is required. In practical systems, however, misalignments are prone to exist. This problem will result in an unsteady system and in a low signal to noise ratio (SNR). Misalignments in the plane of the mounted antenna array between the transmitter and receiver can be the result of rotation or tilt.

In the present disclosure, beam-steering is used to assist and correct phase misalignments in a LoS MIMO system. Incorporating beam steeling with FFT/IFFT results in a stable system that has the flexibility of redirecting the beam to the intended receiver. Assuming a backhaul network with multiple base stations as shown below, the present disclosure aims to provide flexible beam steerability while using the same mounted antenna array i.e., one transmitter (TX) can communicate with multiple receivers (RXs) located at different distances by tuning the phase in a mesh network. The integration of beam steering with FFT/IFFT improves the wireless communication system's robustness against misalignments and offsets from both link ends.

Figure 2:
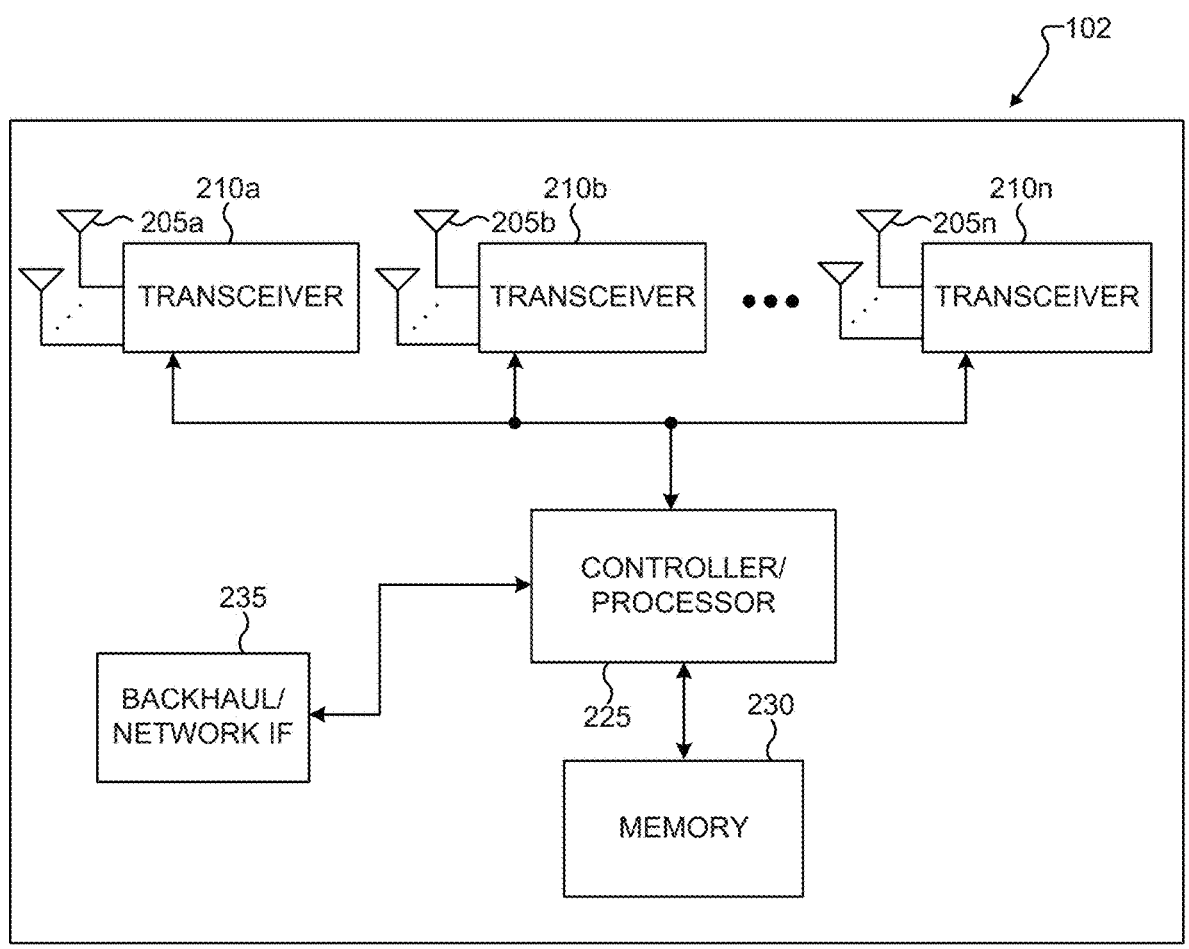
FIG. 2 illustrates an exemplary base station (BS) utilizing circular antenna arrays designed according to various embodiments of this disclosure.
Figure 3:
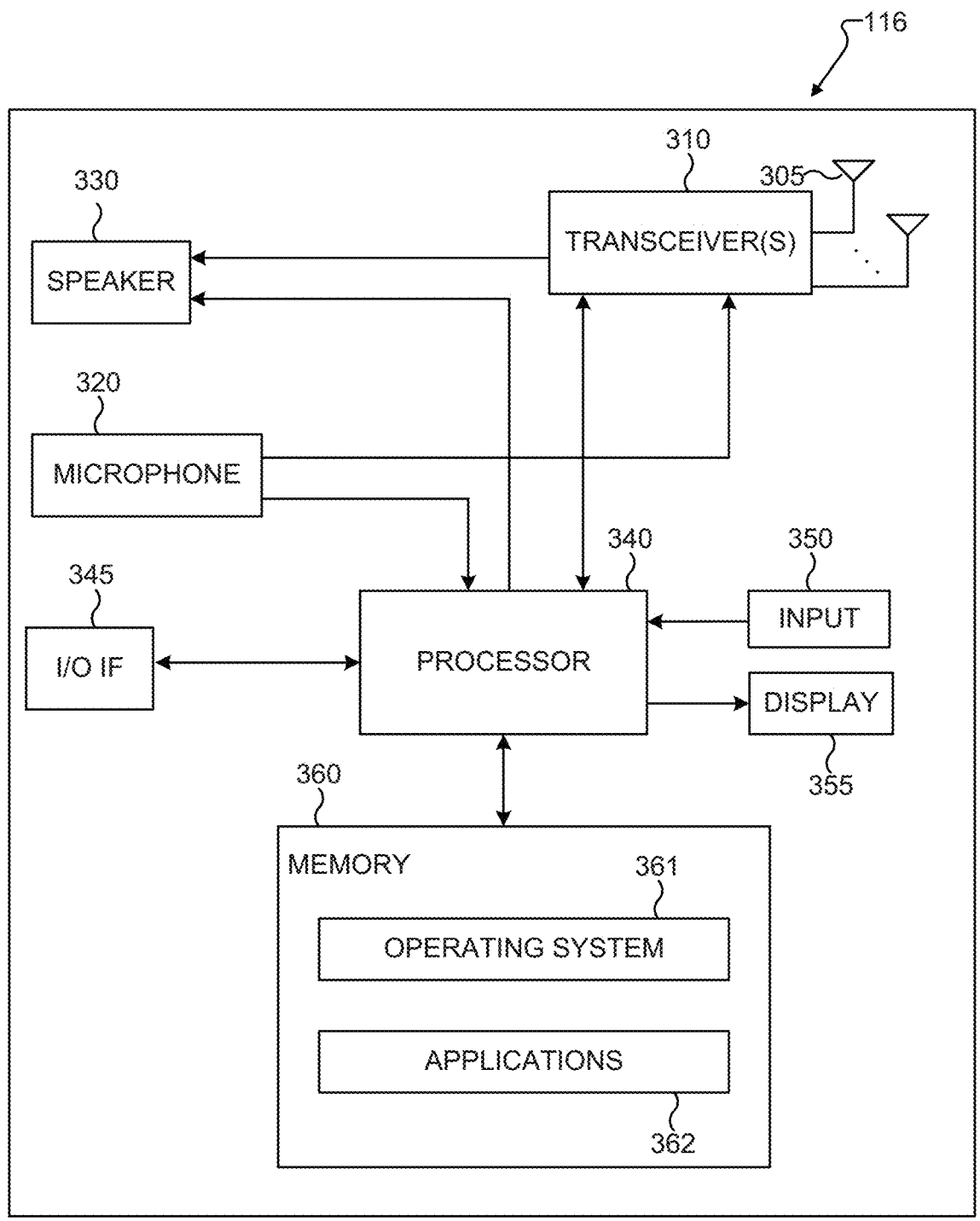
FIG. 3 illustrates an exemplary electronic device for communicating in the networked computing system utilizing circular antenna arrays designed according to various embodiments of this disclosure.

FIGS. 1-3 below describe various embodiments imple en ed in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an exemplary networked system utilizing circular antenna arrays designed according to various embodiments of this disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNI3 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a LIE 111, which may be located in a small business; a UE 112, which may be located in an enterprise; a UE 113, which may be a WiFi hot pot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of ILIEs includes the UE 115 and the UE 116. In some embodiments, one or more of the gNBs 101-103 may communicate with each other and with the liEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols. e.g., 5G/NR 3rd generation partnership project (3GPP) NR, long term evolution (LTE), LTE advanced (LTE-A), high speed packet access (HSPA), Wi-Fi 802.11 a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with naturaland man-made obstructions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an exemplary base station (BS) utilizing circular antenna arrays designed according to various embodiments of this disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s), example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an exemplary electronic device for communicating in the networked computing system utilizing circular antenna arrays designed according to various embodiments of this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE. 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver (s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from giNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a. random-access memory (RAM), and another part of the memory 360 could include a. Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
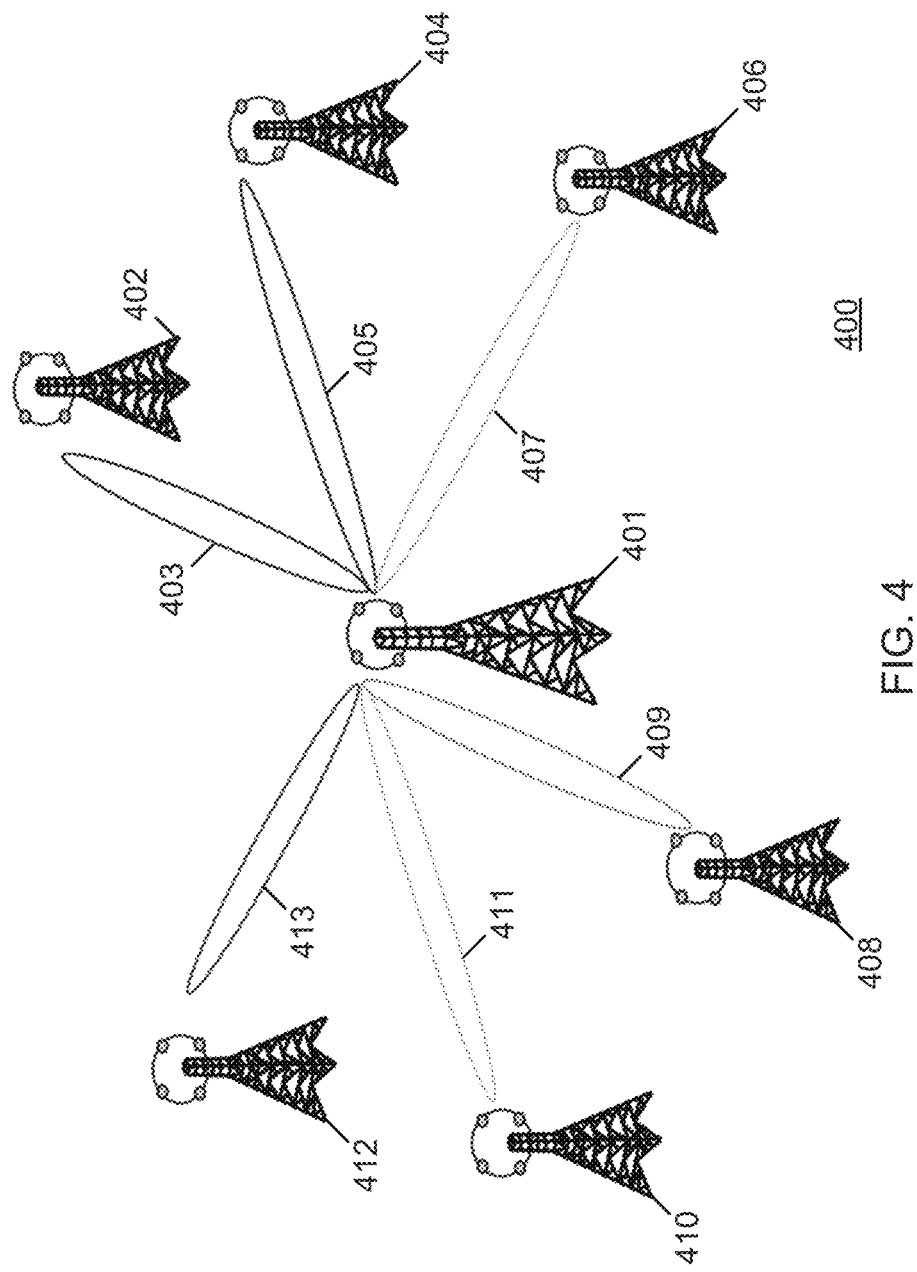
FIG. 4 shows an example of a high-speed backhaul mesh network with UCAs designed according to various embodiments of this disclosure.

FIG. 4 shows an example of a high-speed backhaul mesh network with UCAs designed according to various embodiments of this disclosure. In network 400, base station 401 equipped with a UCA communicates with base station 402 via beam 402, with base station 404 via beam 405, with base station 406 via beam 407, with base station 408 via beam 409, with base station 410 via beam 411, and with base station 412 via beam 413. Each of base stations 402, 404, 406, 408, 410, and 412 is also equipped with a UCA.

Among the general problems to be solved when implementing network 400 are:

The LoS MIMO channel model for TEL bands has inaccuracies when utilizing a planar wave assumption, which inaccuracies are the product of the large phases errors of the "planar array" model.

In LoS MIMO, misalignments (in azimuth of elevation, or in offsets) can impact the maximum data rate in a communication system.

Singular value decomposition techniques for MIMO systems can overcome misalignment issues but is computationally cumbersome. Larger arrays require more operations, which can be problematic in dynamic scenarios.

The geometry of the planar array offers limitations in the robustness (limited range for optimal operation and not applicable for mobile applications) and capacity of the system such that new geometries need to be explored.

Implementation of low-complexity strategies for robustness in the system are necessary to achieve high spectral efficiency for next generation communication systems.

One specific problem addressed by the present disclosure is the excessive computational complexity overhead for pre-coded-based THz LoS MIMO system in high data-rate applications.

The present disclosure reduces the complexity of pre-coder-based LoS MIMO system based on singular value decomposition (SVD) by using analog beam steering techniques with IFFT/FFT. By applying the principles of the present disclosure, the channel matrix can be diagonalized using only analog RF circuitry instead computationally complex procedures with large overheads. This technique uses the intrinsic circulant property of a UCA LoS MIMO channel to allows perfect diagonalization by using just a rotation matrix (of which IFFT/FFT is a special case). In other words, the IFFT/FFT analog system (e.g., Butler Matrix) can replace the SVD precoder.

However, to improve the robustness against angular misalignments in a mesh network (azimuth, elevation) or displacements (offsets), an analog beam steering strategy is proposed to help the IFFT/FFT analog precoder.

Accordingly, the present disclosure designs a uniform circular array assisted with an analog IFFT/FFT precoder to reduce the computational complexity in LoS MIMO backhaul mesh networks.

The present disclosure also incorporates beam steering as a complement for the IFFT/FFT precoder technique, to improve the flexibility of steering the beams in a mesh network to the intended destination.

Moreover, each port in the UCA in the present disclosure is composed of a steerable miniaturized array with beam steering capabilities.

Analysis is begun with a simple case of one TX and one RX, for which analysis of the system is based in a normalized Rician channel where the channel matrix H for M is the number of antennas in the Tx array and N antennas in the Rx array can be described as follows [4]:

$$H_{M \times N} = \sqrt{\frac{K}{K+1}} H_{LoS} + \sqrt{\frac{1}{K+1}} H_{NLoS} \quad (1)$$

$$H_{LoS} = [e^{-jkd_{m,n}}]_{M \times N},$$

$$H_{NLoS} \sim CN(0, \sigma^2 I)$$

where $H_{LoS}$ is the line-of-sight component described by the geometry of the array, $k=2\pi/\lambda$ is the wavenumber of the carrier, $\lambda$ is the wavelength of the carrier, $H_{NLoS}$ represents the statistical behavior of scatterers modeled as independent and identically distributed complex normal distributed matrix with mean zero and standard deviation equal to one ($H_{NLoS} \sim CN(0, I)$, where I is the identity matrix), and K represents the Rice Factor of the channel, which is the power ratio between the LoS and non-line-of-sight (NLos) components of the channel.

For this channel model, the assumption is that the distance D between the transmitter and receiver arrays is large compared to the inter-antenna spacing d (D>>d), therefore the path gain experiences in each antenna pair between the transmitter and receiver is approximately the same. Therefore, without loss of generality the path gain may be normalized and focus may concentrate on a "phase" analysis.

As reflected in Eq. 1, the channel model is directly related to the geometry of the array, where each element of both arrays is considered an isotropic antenna. For a Tx UCA array at the origin and having M antennas uniformly spaced with the radius $R_t$, the coordinates of the antenna elements is given by:

$0=[0\ 0\ 0]$, $Tx_m = [R_t \cos(\theta_m), R_t \sin(\theta_m), 0]^T$, (2)

On the opposite side of the link, the Rx UCA array located a distance D meters away from the Tx array and having N antennas uniformly spaced at a radius $R_r$, the coordinates of the antenna elements is given by:

$0=[0\ 0\ D]$, $Rx_n = R_\gamma(\gamma) R_\psi(\psi)[R_r \cos(\theta_n), R_r \sin(\theta_n), D]^T + [\Delta_x, \Delta_y, \Delta_z]$. (3)

In Eqs. 2 and 3, additional terms to model offsets that may occur when the arrays are deployed (e.g., angular or displacement offsets). Rotations in azimuth ($\gamma$) or elevation ($\psi$) or center shifts $[\Delta_x, \Delta_y, \Delta_z]$ emulate placement of an antenna in a tower for a backhaul link. To simplify the analysis, without loss of generality, the misalignments are assumed to be focused in the receiver end [5]:

$$R_\gamma(\gamma) = \begin{bmatrix} \cos(\gamma) & 0 & \sin(\gamma) \\ 0 & 1 & 0 \\ -\sin(\gamma) & 0 & \cos(\gamma) \end{bmatrix}, \quad (4)$$

$$R_\psi(\psi) = \begin{bmatrix} 1 & 0 & 0 \\ 0 & \cos(\psi) & -\sin(\psi) \\ 0 & \sin(\psi) & \cos(\psi) \end{bmatrix}$$

Eqs. 2, 3 and 4 describe two UCAs in the x-y plane with a distance D between centers and UCA radii $R_t$, $R_r$, $\theta_m$ is the angle of the m-th array element at the Tx, where $$\theta_m = \frac{2\pi}{M}(m), m \in (0, \ldots, M-1),$$

and similarly $\theta_n$ is the angle of the n-th element in the Rx array, where $$\theta_n = \frac{2\pi}{N}(n), n \in (0, \ldots, N-1).$$

To apply the Rician channel explained in [4], computation of the Euclidean distance between the m-th Tx antenna and the n-th Rx antenna is necessary, which is computed as follows:

$$d_{m,n} = \sqrt{D^2 + R_t^2 + R_r^2 - 2R_tR_r\cos(2\pi(\theta_n - \theta_m\theta_0))}, \quad (5)$$

where $\theta_0$ is the difference in angular offset between the Tx and Rx UCAs.

Figure 5:
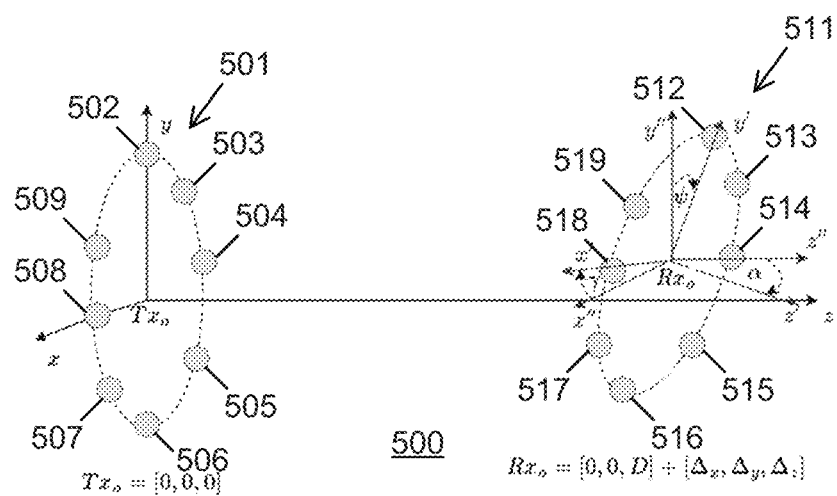
FIG. 5 illustrates a coordinate system for the UCA channel model implemented for the analysis herein and discussed above.

FIG. 5 illustrates a coordinate system for the UCA channel model implemented for the analysis herein and discussed above. The Tx array 501 includes M antennas 502, 503, 404, 505, 506 507, 508, and 509 and is as discussed above) centered in the sigin (0=[0 0 0]) with all antennas at a radius $R_t$ from the origin and uniformly spaced around the origin, and with the mth antenna elementhaving an angular offset of $$\theta_m = \frac{2\pi}{M}(m), m \in (0, \ldots, M-1).$$

On the opposite side of the link, the Rx array 511 is placed a distance D meters away from the Tx array 501, at 0=[0 0 D]. The Rx array 511 includes N antennas 512 513, 514, 515. 516, 517, 518, and 519 all at a radius $R_r$ from the origin and uniformly spaced around the origin, with the nth Rx antenna element having an angular offset $$\theta_n = \frac{2\pi}{N}(n), n \in (0, \ldots, N-1).$$

In the analysis herein, is the carrier wavelength, D is the distance between the Tx and Rx, $\psi_{Tx}$, $\psi_{Rx}$ are the elevation angles for the Tx and Rx, $\gamma_{Tx}$, $\gamma_{Rx}$ are the azimuth rotation angles and $\alpha_{Tx}$, $\alpha_{Rx}$ are the angles between the normal vector with respect to the Tx/Rx array and the x'-axis (parallel to the x-axis).

Figure 6:
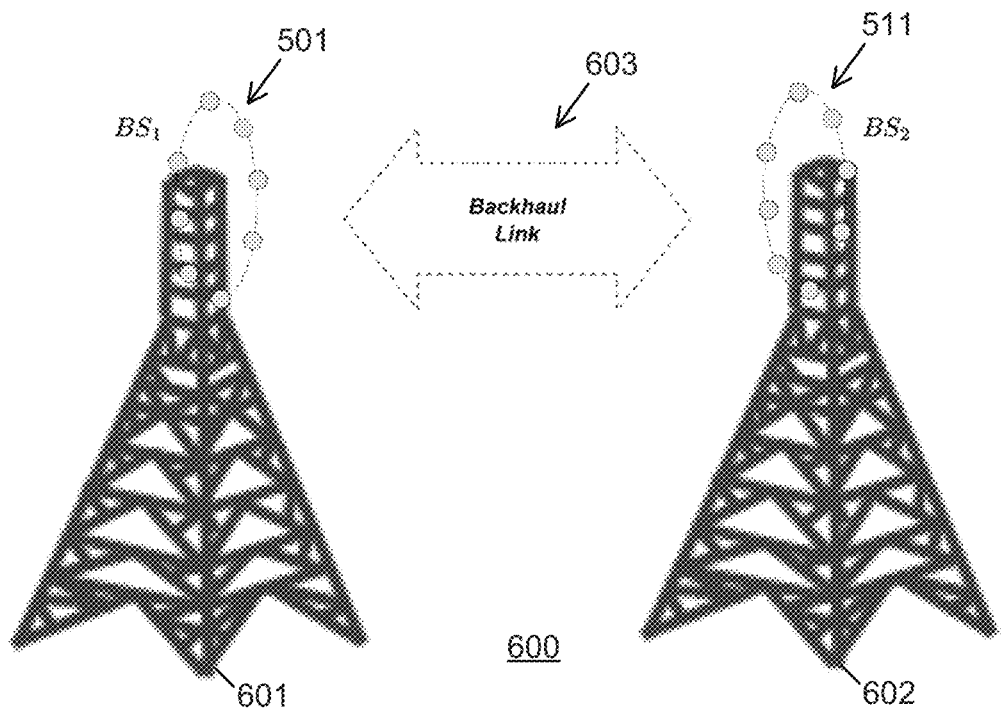
FIG. 6 illustrates an example of the implementation of utilizing the UCAs for high-speed backhaul links.

FIG. 6 illustrates an example of the implementation of utilizing the LICAs 501, 511 for high-speed backhaul links, which is the scenario selected for the analysis. The network 600 includes two base stations $BS_1$ 601 and $BS_2$ 602, with a wireless backhaul link 603 therebetween. However, the subject matter of the present disclosure may be used in fixed wireless access (FWA), and in mobile access scenarios as well.

The capacity of any MIMO channel by assuming an SVD precoding strategy:

$$H_{M \times N} = U_{M \times M} \Sigma_{M \times N} V_{N \times N}^\dagger \qquad (6)$$

where U, V are unitary matrices, † indicates the conjugate transpose, and $\Sigma \leq \text{diag}(\sigma_1, \sigma_2, \ldots, \sigma_P)$ is a diagonal matrix with P elements, where P=min(M, N) and each element in the matrix $\Sigma$ is ordered from the largest to the smallest (i.e., $\sigma_1 \geq \sigma_2 \geq \ldots \sigma_{R_H} > \sigma_{r+1} = \sigma_P = 0$) (that is, a diagonal matrix of the highest eigenvalues), and where $R_H$=rank(H) is the rank of the matrix H [4,6].

To compute the capacity, use is made of the work from Shannon [7], Winters [8], and Foschini [9], who stated that the capacity C in a MIMO channel is computed as:

$$C = \max_{Rx:Tr(Rx)=\rho} B \log_2(\det(I_M + HR_xH^\dagger)) = \qquad (7)$$

$$\begin{cases} C_{Water} = \max_{P_i: \Sigma_i P_i \leq P} B \sum_{i=1}^{R_H} \log_2\left(1 + \frac{P_i}{P}\gamma_i\right) \\ C_{EPA} = B \sum_{i=1}^{R_H} \log_2\left(1 + \frac{\gamma_i}{N}\right) \end{cases}$$

where B is the bandwidth, $I_M$ is the identity matrix of size M, and $R_x$ is a receiver matrix. If the channel is known by the transmitter, then the power $$\left(\frac{P_i}{P}\right)$$

is allocated by the water-filling power allocation algorithm [6] ($C_{Water}$), where $\pi_n^2$ is the noise power and $$\gamma_i = \frac{\sigma_i^2 P}{\sigma_n^2};$$

otherwise the power $\rho$ on each eigenmode $$\left(R_x = \frac{\rho}{N} I_N\right)$$

is equally distributed and the capacity will be $C_{EPA}$.

Without loss of generality, the number of antennas on both link ends may be assumed to be the same (N). The optimal preceding strategy for a MIMO scenario is the use of SVD to estimate the precoder and receiver algorithms. However, as explained in [10], the computational complexity for a SVD precoder-receiver is $$CC_{MIMO} = \frac{4N^3 + 21N^2 - 12N}{6},$$

and SVD precoding requires the entire channel matrix to be sent back to the transmitter. When N increases, the feedback data required for this strategy increases significantly.

For this reason, a low complexity strategy is necessary favor arrays with large number of elements (i.e., massive MEM). In [11], the authors proposed decomposing the UPA into a uniform concentric circular array (UCCA), in order to use the intrinsic properties of a LoS MIMO channel for a uniform circular array (UCA).

A UCA LoS MIMO channel in perfect alignment is a circulant matrix, and can be represented as:

$$H_{MIMO} = F^\dagger \Delta F \rightarrow H_{IFFT-FFT} = F H_{MIMO} F^\dagger \rightarrow H_{IFFT-FFT} = \Delta \qquad (8)$$

$$\Delta = \text{diag}(\lambda_1, \lambda_2, \ldots, \lambda_N), \lambda_n = \left|\frac{\beta_0}{4\pi} \sum_{m=1}^{N} \frac{e^{-jkr_{m,1}}}{r_{m,1}} e^{\frac{-j2\pi nm}{N}}\right|$$

where F is a DFT matrix. A great advantage of this strategy is that the DFT matrix can be implemented with RF analog circuitry (e.g., Butler Matrix). The impact in the computational complexity is vast because the SVD is completely overlapped by an analog process, leaving a diagonal matrix where the complexity is $CC_{IFFT-FFT}$=2N. In other words, the interference between the eigenmodes of the channel is completely nullified.

FIG. 7 is a block diagram illustrating an analog IFFT/FFT implementation in a UCA LoS MIMO system, with the IFFT/FFT using RF analog circuitry (e.g., Butler Matrix) that allows the complexity reduction in the processing by replacing the SVD. The IFFT/EFT implementation 700 includes a transmitter 701 and a receiver 702, respectively including UCA 501 and UCA 511. Transmitter 701 includes N inputs receiving N signals $x_1 \ldots x_N$ at each of corresponding RF chains 703a-703n. RF analog processing $F^\dagger$ 704 (e.g., a Butler matrix) generates signals for antennas 501, which transmit those signals in beams 710. The transmitted signals are received on beams 720 at antennas 511, which provide the received signals to RF analog processing F 705 (e.g., a Butler matrix) to produce signals for RF chains 706a-706n to output N signals $y_1 \ldots y_N$.

The circulant property of the UCA LoS MIMO is susceptible to offsets in azimuth, elevation and displacements between both link ends. These misalignments increase the interference between eigenmodes and so reducing the signal to interference and noise ratio (SINR) and maximum data rate achievable in the channel.

Using the above-described channel model with IFFT-FFT for diagonalization, a strategy to solve the SINR issues products of the angular or displacement offsets that may occurs in a backhaul placement is tested. The idea behind this strategy is to correct the offset by using a phased array circuitry that steers the array hitting the opposite end. This approach is implemented in an orbital angular momentum (OAM) system [12-13] and, due to the similarities between OAM and UCA LoS MIMO, may be used for this purpose.

FIG. 8 is a block diagram illustrating a beamsteering addition to an analog IFFT/FFT implementation in a IJCA LoS MIMO system in accordance with embodiments of the present disclosure. The implementation 800 includes a transmitter 801 and a receiver 802, respectively including UCA 501 and UCA 511. Transmitter 801 includes N inputs receiving signals $x_1 \ldots x_N$ at each of corresponding RE chains 803a-803n. RF analog processing $F^\dagger$ 804 (e.g., a Butler matrix) generates signals to be transmitted. However, before those signals are forwarded to antennas 501 for transmission in beams 810, analog circuit 830 "corrects" the phase based on estimated angles γ, ψ on both sides of the link. The transmitted signals are received on beams 820 at antennas 511, which passes the received signals to an analog circuit 831 for phase "correction" before forwarding to RF analog processing F 805 (e.g., a Butler matrix) to produce signals for RE chains 806a-806n to output N signals $y_1 \ldots y_N$.

The mathematical model for this strategy is described as follows:

$$W_D = 1_U \otimes w_D, \; w_D = [e^{jw_1^D}, \ldots, e^{jw_N^D}], \; V_D = 1 \otimes v_D = [e^{-jv_1^D}, \ldots, e^{-jv_N^D}], \quad (9)$$

where ⊗ is a Kronecker product, 1 is the ones vector and $1_U$ is the ones vector of size U, and $$w_m^D = kR_t(\sin(\theta_m)\sin(\psi)\cos(\gamma) - \cos(\theta_m)\sin((\psi)),$$

$$v_m^D = kR_t(\sin(\theta_n)\sin(\psi)\cos(\gamma) - \cos(\theta_n)\sin((\psi)). \quad (10)$$

As above, $R_t$ and $R_r$ are the radius for antennas in the UCA 501, 511, respectively; $\theta_n$, $\theta_m$ are angular offsets for the nth, mth antenna in the UCA 501, 511, respectively; ψ is the elevation angle for the center of UA 511 relative to UCA 501; and γ is the azimuth rotation angle for the center of UCA 511 relative to UCA 501. The resulting channel with beam steering is:

$$H_{IFFT-FFT}^{BS} = (W_D \odot F) H_{MIMO} (V_D^T \odot F^\dagger), \quad (11)$$

where ⊙ indicates a Hadamard product. As shown in FIG. 8, $V_D^T$ is implemented by the analog circuit 830 between RF analog processing 804 and UCA 501 while $W_D$ is implemented by the analog circuit 831 between UCA 511 and RF analog processing 805.

The present disclosure focuses on LoS MIMO using FFT/IFFT analog precoding to reduce the computational complexity of the system. A similar approach was discussed in [14]—but using a uniform planar array (LPA) in contrast to the UCA design employed in the present disclosure. Furthermore, [12-13] introduce beam steering as a method to steer signals to the intended destination—but with emphasis on the digital (not analog) domain. In present disclosure, an efficient configuration is presented that uses both FFT/IFFT precoding with beam steering, all in the analog domain. Thus, the channel model in [12-13] is completely different than the current channel model employed herein, since the channel model herein establishes a realistic scenario with scatterers (i.e., NLoS paths). Furthermore, beam steering in [12-13] was used in an OAM system, while the present disclosure focuses on near field LoS MIMO communication backhaul networks. In the present disclosure, signals are not sent in multiple modes (as done in OAM), but instead the signal streams are multiplexed.

Figure 9:
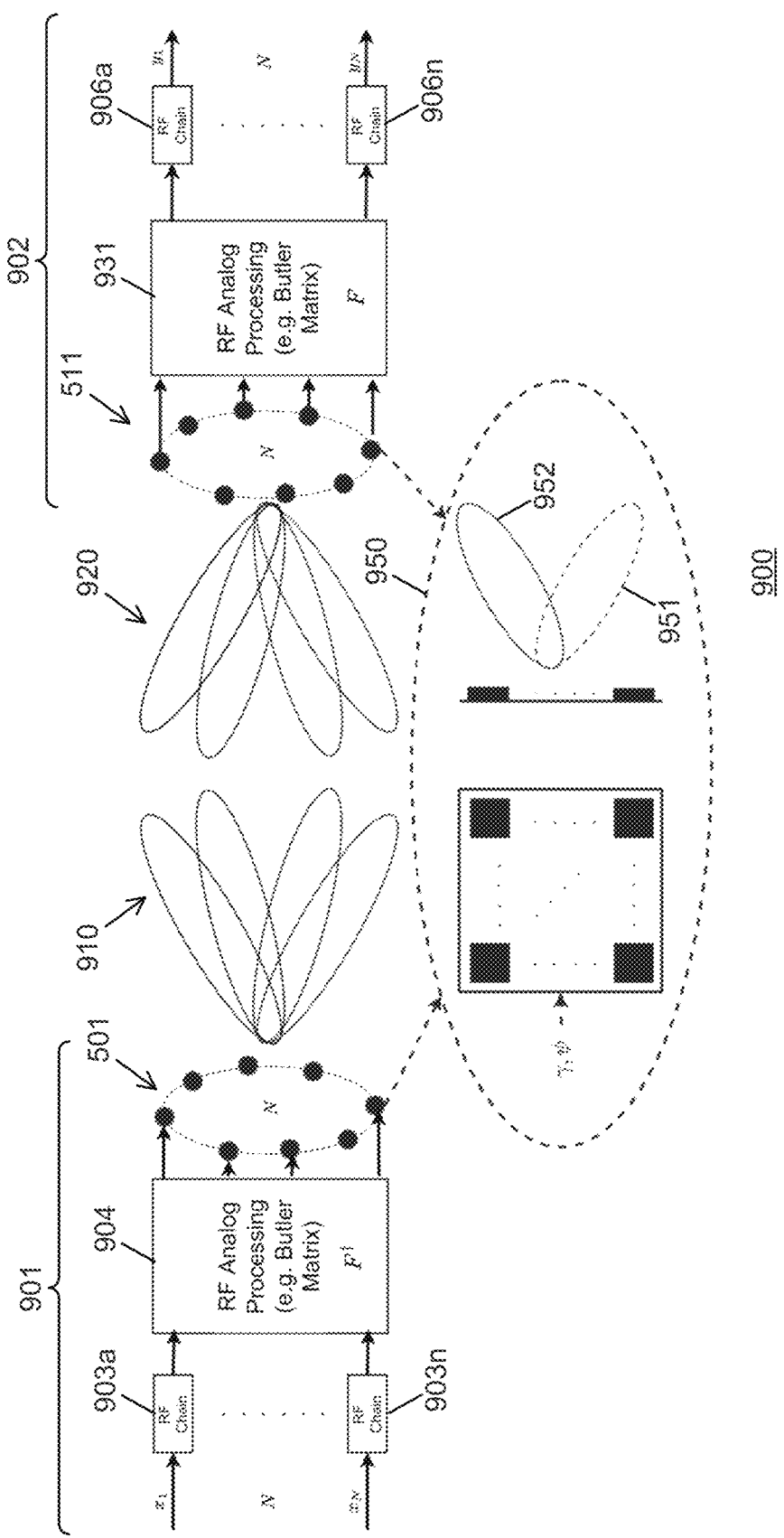
FIG. 9 is a block diagram illustrating beamsteering in a UCA LoS MIMO system using miniaturized steerable arrays as UCA elements in accordance with embodiments of the present disclosure.

Finally, instead of implementing the beam steering with an analog phase array network for the entire UCA, as described in [12-13], the system of the present disclosure will work with miniaturized steerable arrays as ports of the UCA providing the steering features, as shown in FIG. 9.

FIG. 9 is a block diagram illustrating beamsteering in a UCA LoS MIMO system using miniaturized steerable arrays as UCA elements in accordance with embodiments of the present disclosure. The implementation 900 includes a transmitter 901 and a receiver 902, respectively including UCA 501 and UCA 511. Transmitter 901 includes N inputs receiving N signals $x_1 \ldots x_N$ at each of corresponding RF chains 903a-903n. RF analog processing $F^\dagger$ 904 generates signals for antennas 501, which transmit those signals in beams 910. The transmitted signals are received on beams 920 at antennas 511, which provide the received signals to RF analog processing F 905 to produce signals for RF chains 906a-906n to output N signals $y_1 \ldots y_N$.

In the embodiment of FIG. 9, each antenna within UCAs 501, 511 is a miniaturized steerable array 950. The miniaturized steerable array 950 receives one or more of N signals $x_1 \ldots x_N$ to be transmitted or one or more of N signals $y_1 \ldots y_N$ to be received, together with estimated angles γ, ψ for the respective side of the link. The miniaturized steerable array 950 determines and implements the phase "correction (s)" based on the estimated angles γ, ψ for the respective transmit or receive beam, in accordance with the discussion above. This may offer some advantages over the embodiment of FIG. 8 in steering individual beams. Having a miniaturized steerable array 950 at each antenna port reduces the area of the analog circuitry compared to having a separate phased array (830, 832) analog system. Of course, both the analog circuits 830, 831 (between RF analog processing 904 and UCA 501 and between UCA 511 and RF processing 931) and the miniaturized steerable array 950 at each antenna of UCAs 501, 511 may be implemented together. Regardless, the beam steering capability allows the seamless deployment of the present disclosure in next generation mesh networks.

The effect of the beamsteering in a pure UCA LoS MIMO channel is analyzed and compared to the use of IFFT/FFT only or SVD by computing the spectral efficiency and capacity of the channel as follows: Assuming a channel matrix H, the SINR of the ith eigenmode is computed by:

$$SINR_i = \frac{P_i |h_{i,j}|^2}{\sum_{j \neq i}^{N} P_j |h_{j,i}|^2 + \sigma_n^2}, \quad (12)$$

where $P_i$ is the power of the ith eigenmode limited by $\Sigma_p$ $P_i = P$ and $\sigma_n^2$ is the average noise power of the system. The spectral efficiency (in bits-per-second/Hertz [bps/Hz]) can be computed as:

$$SE = \sum_i \log_2(1 + SINR_i). \quad (13)$$

Next, the performance of the beamsteering in a pure UCA LoS MIMO scenario is evaluated and compared against the use of IFFT/FFT only and SVD precoder/receiver strategies. The parameters for this analysis are as follows:

$$R_t = R_r = R = \sqrt{\frac{\lambda D}{2N \left(\sin\left(\frac{\pi}{N}\right)\right)^2}}, \quad (14)$$

where, for an exemplary analysis, N=4, $f_c$=140 GHz (from which λ may be derived), D=100 meters ([m]), and $\bar{\rho}$=10 dB (from which $\sigma_n^2$ may be determined).

Figure 10A:
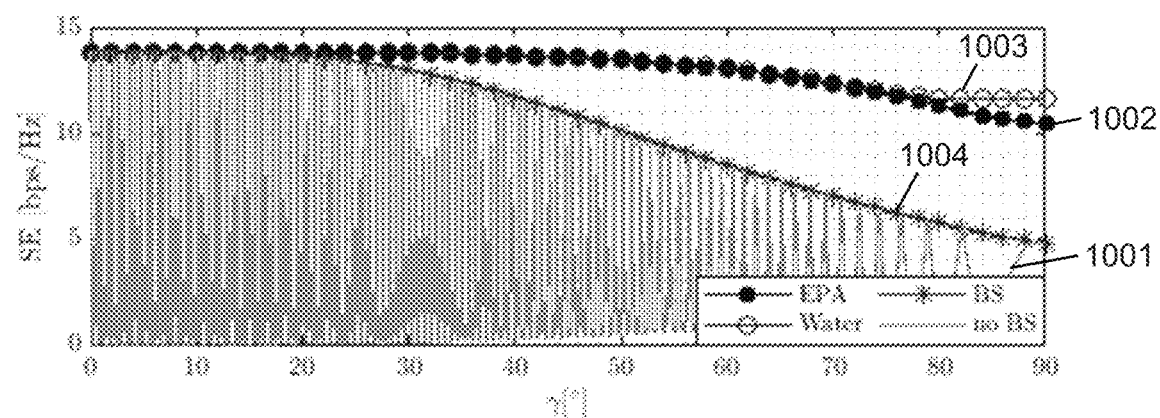
FIGS. 10A and 10B are comparative plots for spectral efficiency (for N=4) determined using the analysis herein.

FIGS. 10A. and 10B are comparative plots for spectral efficiency determined using the above-described analysis, where FIG. 9A plots SE as a function of increasing γ and FIG. 9B plots SE as a function of increasing ψ. Both plots include: IFFT/FFT analog precoder without beamsteering 1001, 1011; SVD precoding with equal power allocation

1002, 1012; SVD precoding with waterfall power allocation 1003, 1013; and IFFT/FFT analog precoder with beamsteering 1004, 1014. The no beamsteering case shows variations in the spectral efficiency product of the misalignments in azimuth or elevation, with the behaviors are similar in both directions. The beamsteering case exhibits a smoother behavior in the spectral efficiency, reaching the maximum capacity when the misalignment is less than about 15". If a threshold of 1% loss of the maximum capacity is set, the angular range is approximately 17°; if the threshold is increased to 5% loss, then the range is extended to approximately 28°:

TABLE 1

Angular range for 1%, 5% loss

| N | $\Delta\gamma_{1\%}/\Delta\psi_{1\%}$ | $\Delta\gamma_{5\%}/\Delta\psi_{5\%}$ |
|---|---|---|
| 4 | 17° | 28° |
| 8 | 14.2° | 21.6° |
| 16 | 4.2° | 6.5° |

Figure 10B:
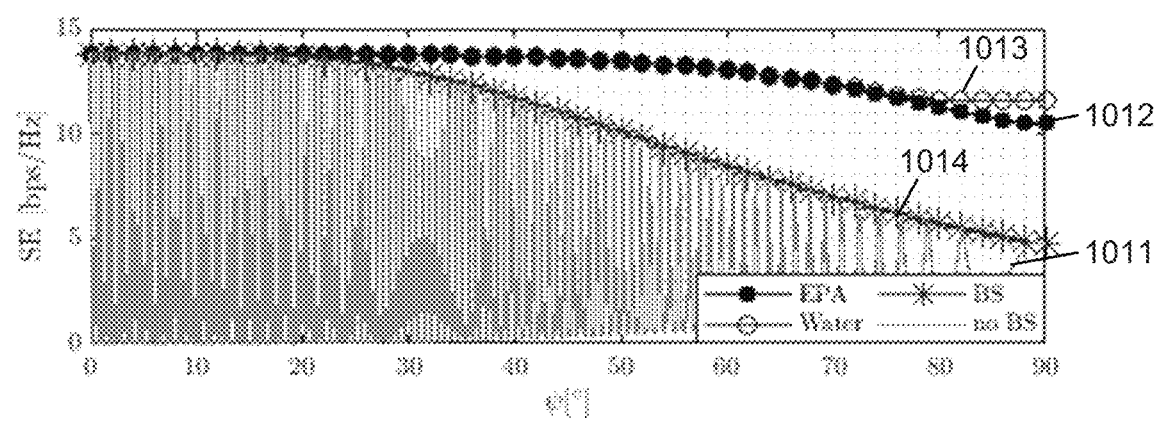
Figure 11A:
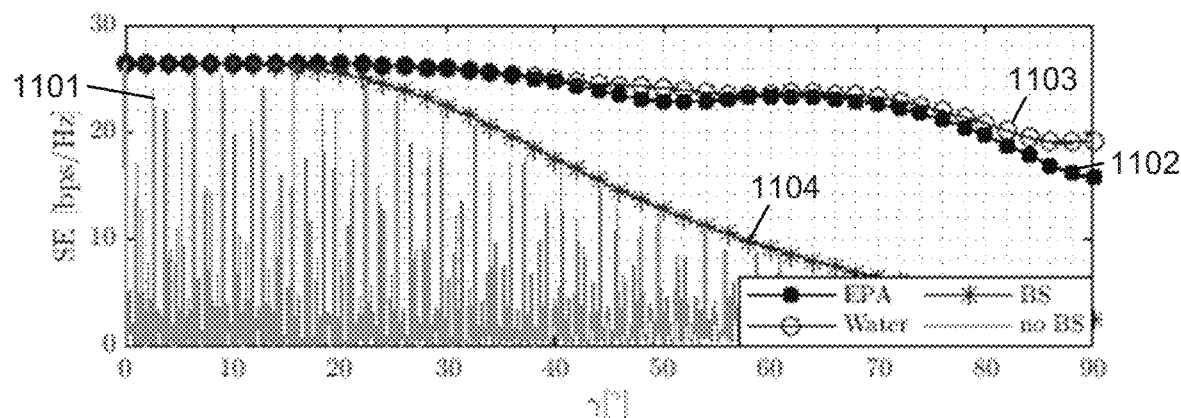
FIGS. 11A and 11B are counterparts to FIGS. 10A and 10B for N=8 (rather than N=4)
Figure 11B:
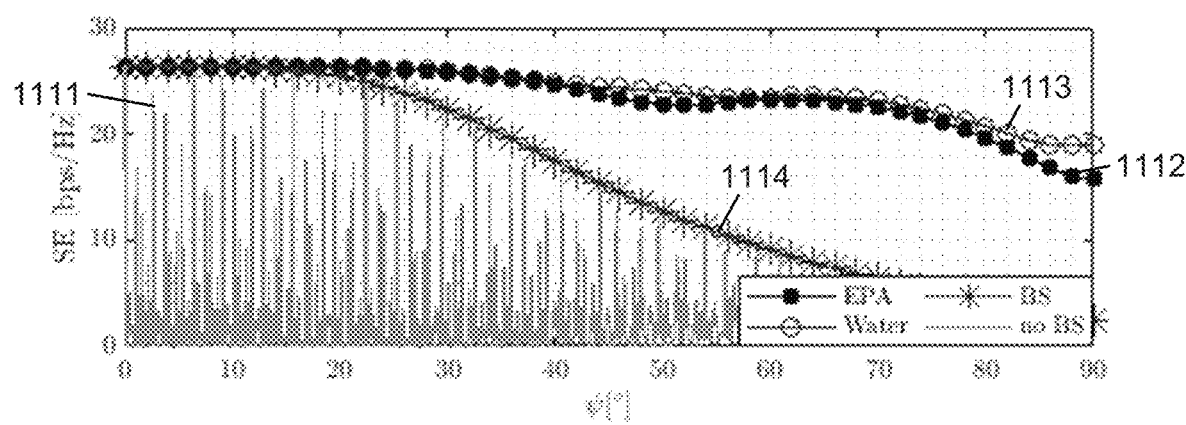
Figure 12A:
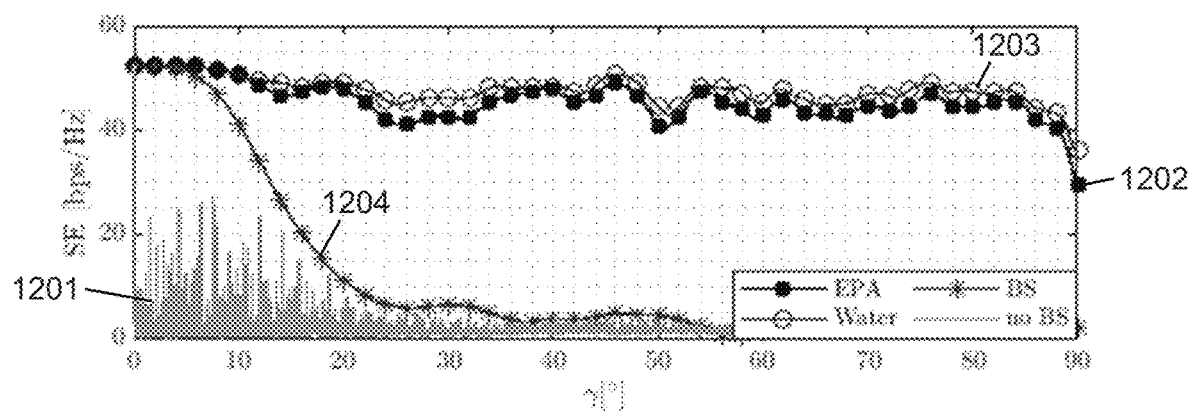
FIGS. 12A and 12B are counterparts to FIGS. 10A and 10B for N=16.
Figure 12B:
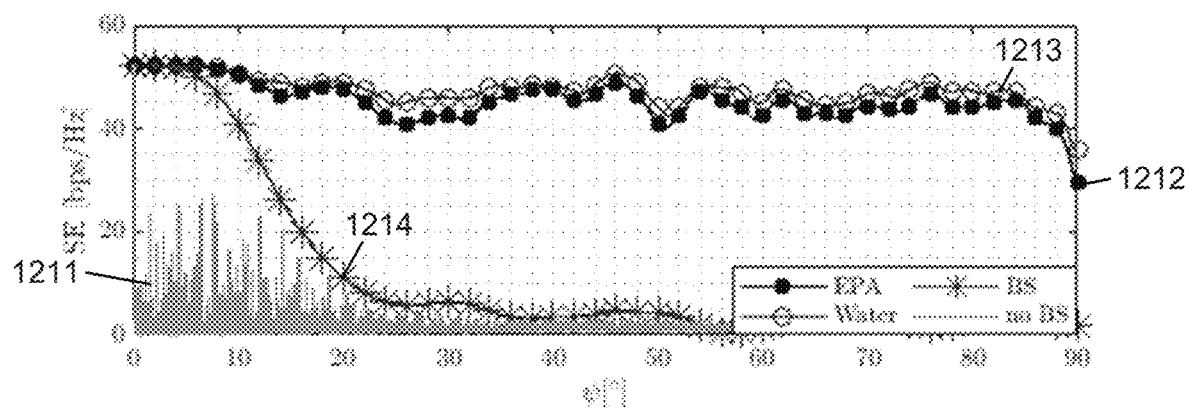

Increasing the number of antenna elements to 8 or 16 produces a reduction in the angular range, as can be seen in TABLE 1 and FIGS. 11A-11B and 12A-12B. FIGS. 11A and 11B are counterparts to FIGS. 10A and 10B for N=8 (rather than N=4), for IFFT/FFT analog precoder without beamsteering 1101, 1111; SVD precoding with equal power allocation 1102, 1112; SVD precoding with waterfall power allocation 1103, 1113; and IFFT/FFT analog precoder with beamsteering 1104, 1114. Similarly, FIGS. 12A and 12B are counterparts to FIGS. 10A and 10B for N=16, for IFFT/FFT analog precoder without beamsteering 1201, 1211; SVD precoding with equal power allocation 1202, 1212; SVD precoding with waterfall power allocation 1203, 1213; and IFFT/FFT analog precoder with beamsteering 1204, 1214. For FIGS. 11A-11B and 12A-12B, the UCA radii were optimized to achieve maximum capacity; using a different value will impact the maximum achievable rate and the angular range.

Figure 13A:
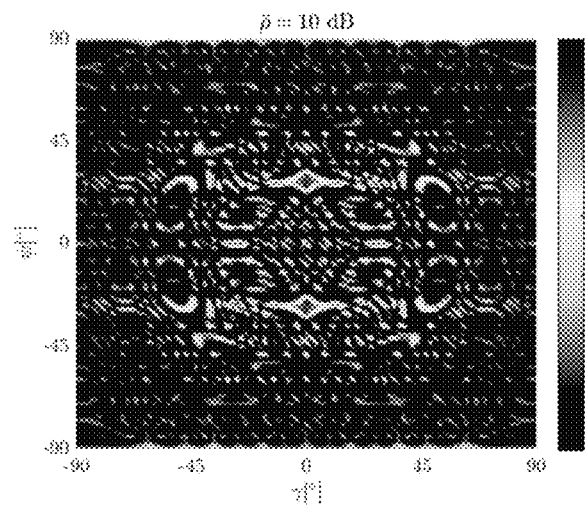
FIGS. 13A and 13B are comparative plots for spectral efficiency between IFFT/FFT without beam steering and with beam steering for combined azimuth/elevation misalignments.
Figure 13B:
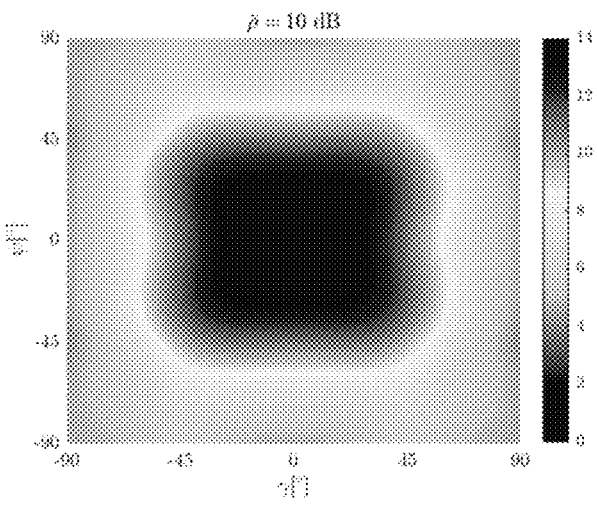
Figure 14A:
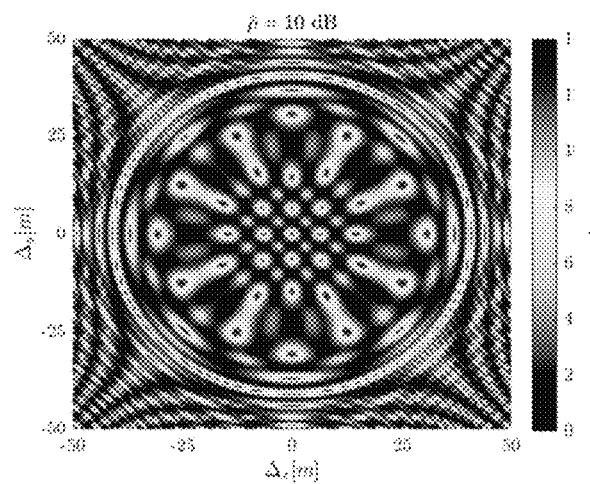
FIGS. 14A and 14B are comparative plots for spectral efficiency between IFFT/FFT without beam steering and with beam steering for combined offset misalignments.
Figure 14B:
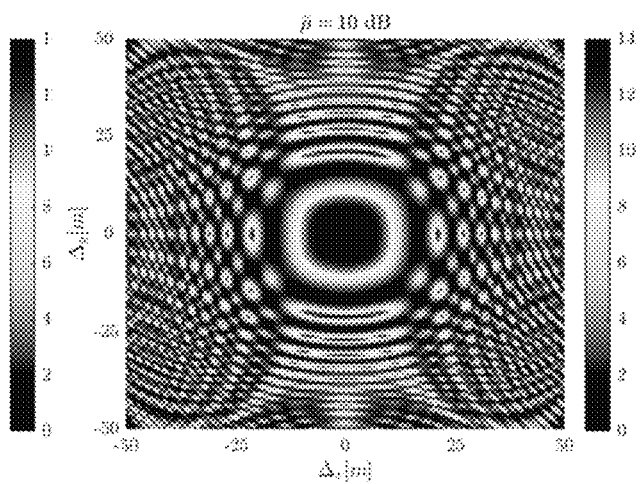

FIGS. 13A and 13B are comparative plots for spectral efficiency between IFTT/FFT without beam steering (FIG. 13A) and with beam steering (FIG. 13B) for combined azimuth/elevation (γ/ψ) misalignments (N=4). FIGS. 14A and 14B are comparative plots for spectral efficiency between IFFT/FFT without beam steering (FIG. 14A) and with beam steering (FIG. 14B) for combined offset ($\Delta_x/\Delta_y$) misalignments (also N=4).

As observed in FIGS. 13A, 13B, 14A, and 14B, beamsteering can help correct misalignment errors to a significant range of angles and offset misalignments. Ripples are observed in FIGS. 14A and 14B as the Rx is moving away from the optimal point, but a central beam is observed in the range of ±10 m, allowing a significant range to work with in case of misalignment. The ripples dissipate faster when N increases and only the main beam remains.

Figure 15A:
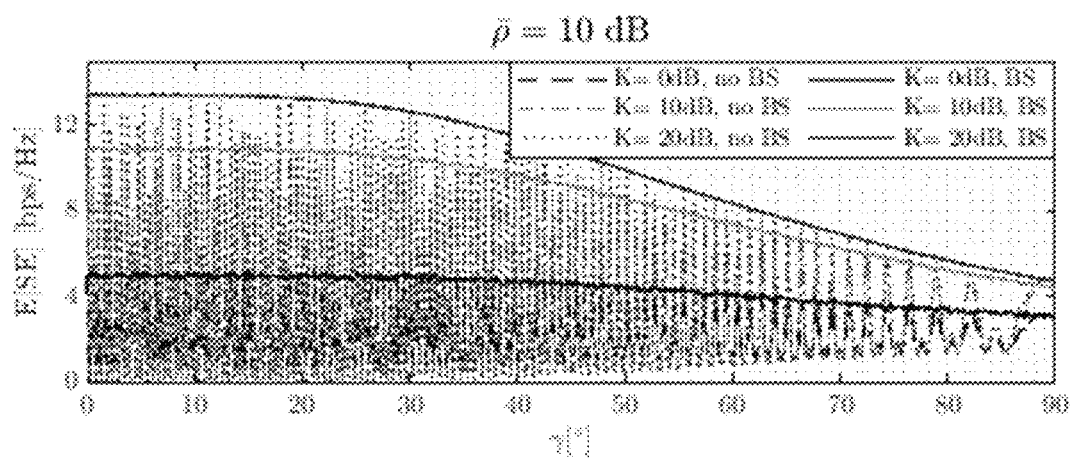
FIGS. 15A and 15B illustrate comparative plots for ergodic spectral efficiency for different Rice factors.
Figure 15B:
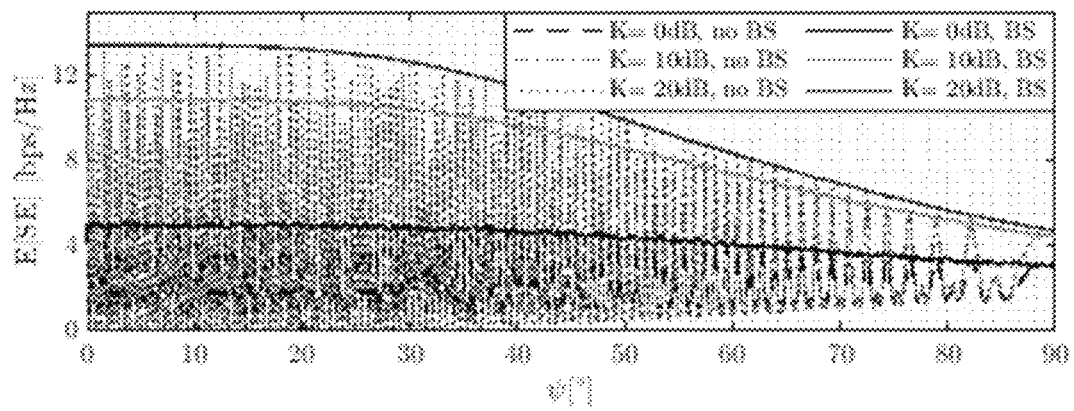
Figure 16A:
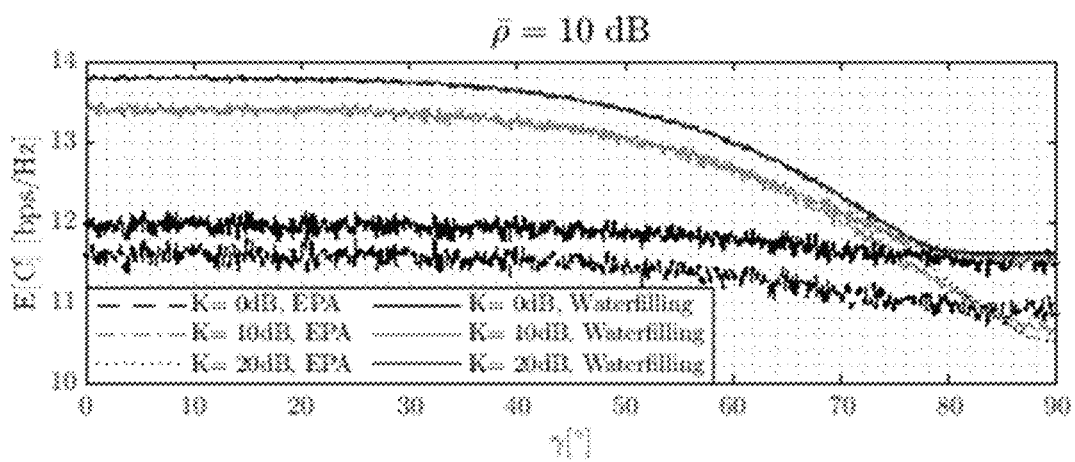
FIGS. 16A and 16B illustrate comparative plots for ergodic capacity for different Rice factors.
Figure 16B:
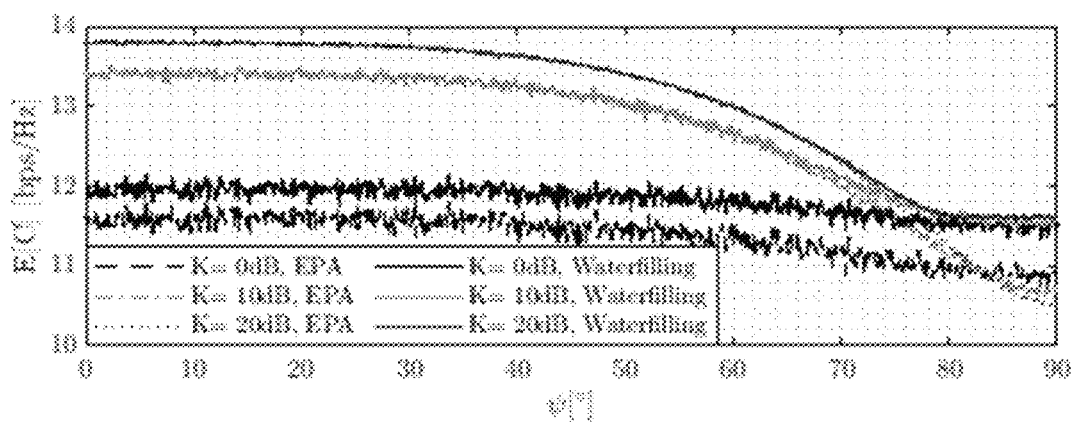

Beamsteering may also be tested in a Rician channel under different Rice factors ($K_{dB}$={0,10,20} dB), FIGS. 15A and 15B illustrate comparative plots for ergodic spectral efficiency for different Rice factors (N=4), while FIGS. 16A and 16B illustrate comparative plots for ergodic capacity for different Rice factors (also N=4).

From FIGS. 15A-15B, it may be observed that beamsteering is impacted by the Rice factor of the channel. A larger K allows beam steering to achieve a higher spectral efficiency, an effect that decreases as the misalignments in azimuth/elevation grow larger. Comparing to FIGS. 16A-16B, it can be observed that the reduction in capacity is smaller compared to beamsteering. This effect can be explained as follows:

SVD is the "optimal" way to maximize the spectral efficiency/capacity in a channel, regardless of whether LoS or NLoS. In other words, SVD takes advantage of the full channel and maximizes the spectral efficiency.

Figure 17A:
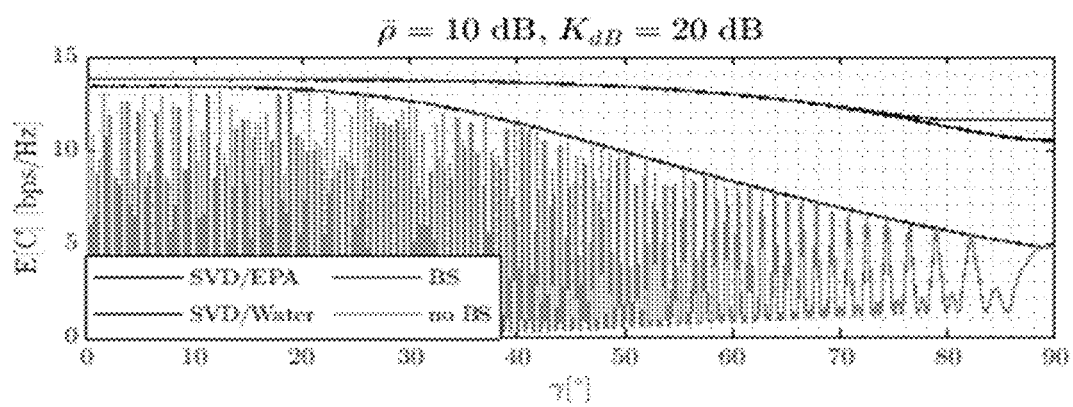
FIGS. 17A-17B illustrate comparative plots for ergodic spectral efficiency.
Figure 17B:
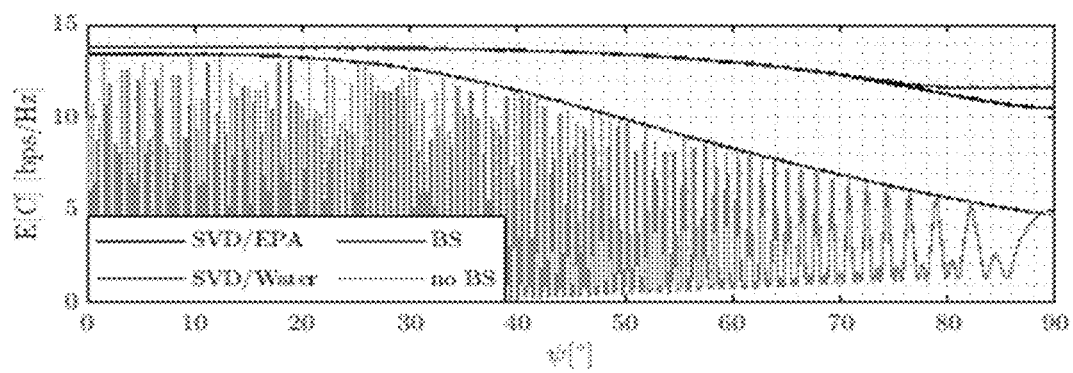

Beamsteering is designed as a strategy to compensate misalignments in LoS UCA MIMO environments. When the NLoS is more dominant in the channel, NLoS will affect performance. Therefore, beamsteering works better for MIMO channels with high Rice factors (LoS dominant channels), as observed in FIGS. 17A-17B, which illustrate comparative plots for ergodic spectral efficiency (N=4).

Another factor that may improve the performance of beamsteering is the use of beam patterns instead of isotropic elements. The beam acts as a "spatial filter," enhancing the LoS paths and filtering the NLoS boosting the rice factor experienced by the system [16].

The present disclosure may be extended for variations and additional features:

Adding steerable lens plus phase shifters as an alternative to the phased array firbeam-steering features.

Add phased array plus time-delay elements as an alternative to counter misalignment or steering over large bandwidths.

Optimal design of a UCA with steerable elements for increased range for multi-user MIMO applications such as mesh networks and P2M applications.

Design of uniform concentric circular arrays (UCCA) to increase the spectral efficiency of LoS MIMO systems for multi-user MIMO in mesh networks and point-to-multipoint (P2M) applications.

Design of UCCA with antenna selection for mobile applications and P2M applications (e.g., drone, high altitude platform station (HAPS), FWA).

For illustrative purposes the: steps of algorithms above are described serially. However, some of these steps may be performed in parallel to each other. The operation diagrams illustrate example methods that can be implemented in accordance with the principles of the present disclosure and various changes could be made to the methods illustrated in the flowcharts. For example, while shown as a series of steps, various steps in each figure could overlap, occur in parallel, occur in a different order, or occur multi es. In another example, steps may be omitted or replaced by other steps.

Although this disclosure has been described with an exemplary embodiment, various changes and modifications may be suggested to one skilled in the art. It is intended that this disclosure encompass such changes and modifications as fall within the scope of the claims.

What is claimed is:

1. A method comprising:
   providing a uniform circular array (UCA) that is assisted with an analog inverse fast Fourier transform (IFFT)/fast Fourier transform (FFT) precoder to reduce computational complexity in one or more line-of-sight (LoS) multiple-input multiple-output (MIMO) networks;
   providing, in each port of the UCA, a steerable miniaturized array with beam steering capability; and
   performing analog beam steering, via the analog IFFT/FFT precoder and the beam steering capability of the steerable miniaturized arrays in the ports of the UCA, for improving one or more properties of steering one or more beams toward one or more intended destinations in the one or more LOS MIMO networks.

2. The method of claim 1, wherein the one or more LOS MIMO networks includes one or more LoS MIMO backhaul mesh networks.

3. The method of claim 1, wherein the one or more properties include analog beam steering flexibility.

4. The method of claim 1, wherein the analog beam steering corrects for offsets in azimuth and elevation for the one or more intended destinations.

5. The method of claim 1, wherein the analog beam steering is based on an estimate for displacement of the one or more intended destinations.

6. The method of claim 1, wherein the analog beam steering is based on estimates for elevation angle ¿ and azimuth rotation y for the one or more intended destinations.

7. The method of claim 1, wherein equal power is allocated to all ports of the UCA.

8. The method of claim 1, wherein a water-filling power allocation scheme is employed to allocate power among best ports of the UCA.

9. The method of claim 1, wherein the analog IFFT/FFT precoder employs a rotation matrix.

10. The method of claim 1, wherein the beam steering is performed based on an angular range for 1% and 5% losses.

11. An apparatus comprising:
a uniform circular array (UCA) that is assisted with an analog inverse fast Fourier transform (IFFT)/fast Fourier transform (FFT) precoder, configured to reduce computational complexity in one or more line-of-sight (LoS) multiple-input multiple-output (MIMO) networks, wherein each port of the UCA includes a steerable miniaturized array with beam steering capability;
a controller configured to perform analog beam steering, via the analog IFFT/FFT precoder and the beam steering capability of the steerable miniaturized arrays in the ports of the UCA, for improving one or more properties of steering one or more beams toward one or more intended destinations in the one or more LOS MIMO networks.

12. The apparatus of claim 11, wherein the one or more LOS MIMO networks includes one or more LOS MIMO backhaul mesh networks.

13. The apparatus of claim 11, wherein the one or more properties include analog beam steering flexibility.

14. The apparatus of claim 11, wherein the analog beam steering corrects for offsets in azimuth and elevation for the one or more intended destinations.

15. The apparatus of claim 11, wherein the analog beam steering is based on an estimate for displacement of the one or more intended destinations.

16. The apparatus of claim 11, wherein the analog beam steering is based on estimates for elevation angle y and azimuth rotation y for the one or more intended destinations.

17. The apparatus of claim 11, wherein equal power is allocated to all ports of the UCA.

18. The apparatus of claim 11, wherein a water-filling power allocation scheme is employed to allocate power among best ports of the UCA.

19. The apparatus of claim 11, wherein the analog IFFT/FFT precoder employs a rotation matrix.

20. The apparatus of claim 11, wherein the beam steering is performed based on an angular range for 1% and 5% losses.

* * * * *